United States Patent Office 3,705,071
Patented Dec. 5, 1972

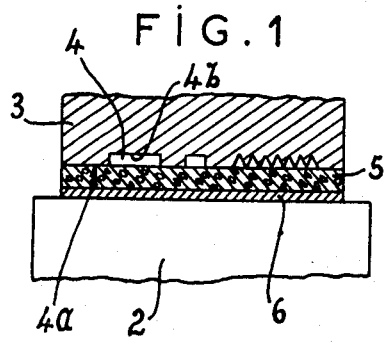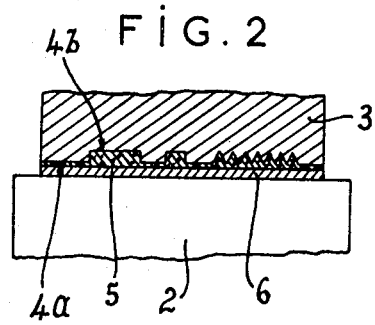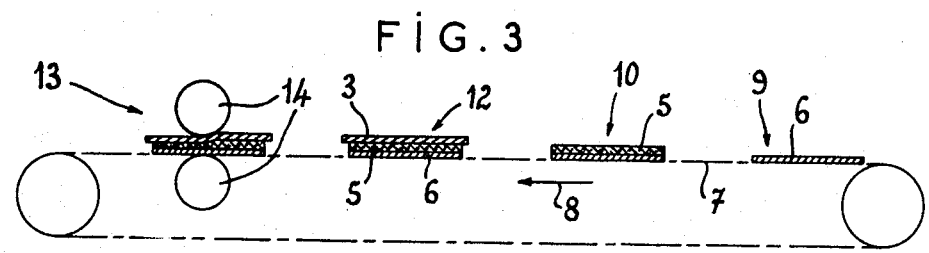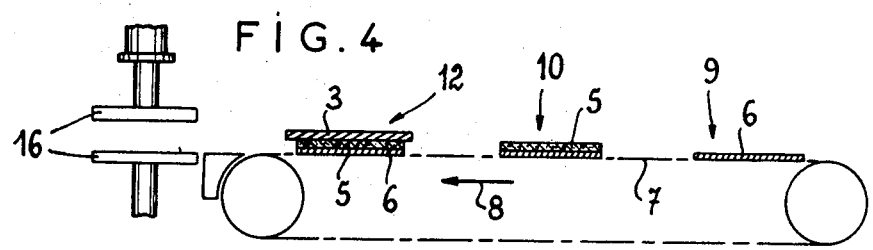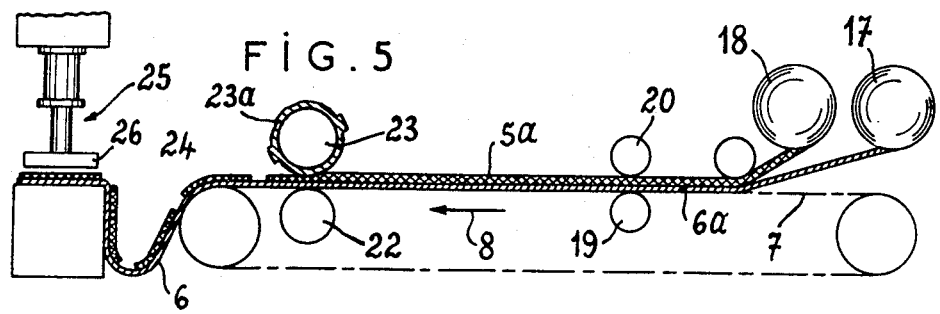

3,705,071
METHOD OF MANUFACTURING THIN COMPOUND MATERIALS, NOTABLY FOR SHOEMAKING
Elie Gras, Thonon, France, assignor to
Etablissements Anver S.A., Paris, France
Filed July 22, 1970, Ser. No. 57,170
Int. Cl. B29c 5/12, 27/04; B32b 27/30
U.S. Cl. 161—116
9 Claims

ABSTRACT OF THE DISCLOSURE

A method for the manufacture of relatively thin pieces useful in the making of components for shoes, morocco articles and other similar articles. A mold is prepared by casting the article in a mold of silicone containing material which has low dielectric losses. A sheet of absorbent material such as PVC foam is impregnated with a pasty or pulverulent plastic material of the same chemical nature as said sheet and having a high coefficient of dielectric losses. On or below said plastic-impregnated sheet is disposed a supporting sheet of leather, textile or other suitable material. A close mutual bonding of these elements is insure by the combined action of compression and the application of high frequency currents for gelling and melting the plastic materials of said sheet and said pasty or pulverulent plastic material, thus causing the complete disappearance of said sheet of absorbent material.

BACKGROUND

Field of invention

This invention relates to methods of manufacturing materials of relatively moderate thickness for the making of shoes, morocco-articles and/or other similar articles.

Prior art

A manufacturing method is already known which consists of lining an impression formed in a mold of insulating resin, characterized by a high coefficient of dielectric losses, with a layer of plastic material in liquid, pasty or pulverulent form and then, after positioning a sheet support on said layer, gelling the plastic material by using high frequency currents.

Although very interesting, this method is attended by various inconveniences which limit its field of application. In fact, during the plastic gelling step, bubbles or blisters, developing as a consequence of the rapid evaporation of the plasticizer or other substances contained in the plastic material, are localized mainly on the face of the article which contracts the mold impression. This obviously impairs the external appearance of the article thus manufactured, which must therefore be rejected.

Moreover, due to its pasty condition and also to its high viscosity, the volume occupied by the plastic material is frequently greater than that of the mold impression so that, when a back-or counter-impression member intended for compressing the plastic therein, is introduced into said mold impression, the excess plastic leaks out or "overflows" from the impression and forms molding fins that must subsequently be removed. This is rather objectionable for one means of preventing the formation of bubbles consists in using a plastic volume definitely greater than the volume of the mold impression.

In addition, when the mold impression has a complicated shape, the distribution of pasty plastic material may lack uniformity.

It is one object of the present invention to avoid these inconveniences by providing an improved method for the purpose set forth hereinabove.

SUMMARY OF THE INVENTION

According to the invention a method is provided which is characterized in that it comprises the following steps:

Forming a mold comprising the negative impression of the article to be manufactured by casting on a model or pattern of this article a silicone-containing material characterized by low dielectric losses and capable of producing an accurate, true negative reproduction of said article;

Impregnating a sheet of absorbent material such as cellular or foam PVC with plastic material in pulverulent, pasty or other form, ready to be gelled and of the same nature as said sheet, for example PVC, and having like said sheet a high coefficient of dielectric losses;

Disposing upon said sheet of plastic-impregnated absorbent material a sheet support such as for example, of leather, textile or other material;

Producing an intimate binding of the component elements of the article by the combined action of pressure causing said mold impression to be pressed against the assembly comprising said plastic impregnated sheet and said sheet support, and by a high-frequency electric field which produces the heating, gelling and melting of only the plastic substances constituting said sheet of absorbent material and said pulverulent or pasty material, causing the complete disappearance of said sheet of absorbent material.

When pressure is applied to the assembly comprising said sheet of absorbent material and said supporting sheet, the former is crushed completely by the edges of the mold impression, but distorted only by the bottom of this impression so as to take the exact shape thereof.

As a consequence of this crushing and distortion, occuring simultaneously with the gelling process, any air contained or trapped in the plastic material impregnating the sheet of absorbent material is expended, whereby an article having exactly the same surface appearance as the mold impression is obtained.

Moreover, during the distortion and melting of the sheet of absorbent material, the latter retains the plastic material and prevents it from overflowing from the mold impression, so that the appearance of the resulting article is improved considerably.

Furthermore, during the temperature increment necessary for gelling the plastic impregnation, the sheet of absorbent material mixes completely with the plastic powder or paste with which it is impregnated and eventually disappears to form therewith a uniform layer of plastic material.

Advantageously, the sheet of absorbent material has initially a thickness greater than the depth of the mold impression.

In one specific embodiment of this invention, in order to increase the mechanical strength of the article, at least one additional sheet of absorbent material of a nature differing from that of the first sheet of absorbent material, having a melting point higher than the gelling temperature and consisting of glass wool, felt, cotton, rubber or any other woven or non-woven material, is associated in said mold impression with the aforesaid first sheet.

This second sheet of absorbent material is compressed jointly with the first one and, upon completion of the gelling step, it becomes an integral part of the article of which it constitutes the reinforcement. Thus, the article has a considerably greater mechanical strength than similar articles not provided with this reinforcement.

According to a preferred embodiment of this invention, pigments of the same chemical character as the plastic materials constituting the sheet of absorbent material and said powder, but having a color differing from that of said powder, are deposited into the whole or part of the hollow portions of the mold impression, preliminary to the positioning of the sheet of plastic impregnated sheet of absorbent material so that, during the gelling process, said pigments combine with the other plastic component substances in order to impart a desired color to the end article, locally in the whole body or depthwise thereof.

BRIEF DESCRIPTION OF THE DRAWING

The attached drawing illustrates diagrammatically and by way of example various methods of this invention.

In the drawing:

FIGS. 1 and 2 are part-sectional, side elevational views showing, on enlarged scale, the sheet of absorbent material before and after the distortion thereof by the mold impression, respectively; and FIGS. 3, 4 and 5 are part-sectional, side elevational views showing diagrammatically three different devices for carrying out the method of this invention.

DETAILED DESCRIPTION

Referring first to FIGS. 1 and 2, element 2 is a fixed support registering with a vertically movable mold 3 formed with an impression 4 the contour and thickness of which correspond to those of the desired article.

The mold 3 is obtained by casting on a model or pattern of the article to be obtained a silicone-containing material having a low coefficient of dielectric losses and capable of forming a very accurate and true negative reproduction of this article. Preferably, silicone rubber of the type available in the trade under the trademark "Silastene" and sold by the Societe Industrielle des Silicones (France) is used. This material is also advantageous in that it permits of stripping the molded article in the hot state.

Each article proper consists of a sheet 5 of absorbent material, notably PVC foam or wadding, applied to the surface of a supporting sheet 6 of leather, textile material or other suitable material.

The sheet of absorbent material 5 is thicker than the mold impression and is impregnated completely by any known and suitable means with plastic material in pasty or pulverulent form, notably vinyl chloride.

It should be noted that the sheet 5 and the paste consist of plastic materials of the same chemical character. Of course, they can be prepared from materials pertaining to groups other than vinyl chloride, provided than these materials have a good coefficient of dielectric losses enabling them to be gelled by using high-frequency currents.

When the sheet 5 is properly positioned together with the sheet 6 between the fixed support 2 and the impression 4 of mold 3, a compression stress is applied thereto. As a consequence of this stress, the sheet-forming material is crushed completely by the edges 4a of mold impression 4 and shaped only by the bottom 4b of this impression so that, at the end of the compression period, its shape corresponds to that of said impression as illustrated in FIG. 2.

In conjunction with the compression step, the plastic materials constituting the sheet 5 and the paste impregnating the same are heated to their gelling temperature by the application of high-frequency currents. Thus, the sheet of absorbent material is closely mixed with the paste and disappears to form therewith a homogeneous layer of plastic material bonded to the supporting sheet 6. On the other hand, it may be noted that this supporting sheet 6 consists of a material having a coefficient of dielectric losses such that when the sheet is exposed to the action of said high-frequency currents, its temperature increases only very slightly, thus precluding any possibility of damaging it during the process.

Furthermore, during the gelling of the plastic material, any bubbles developing in the material constituting said sheet 5 will flow freely through the structure of this material which, on the other hand, prevents the plastic material from overflowing laterally out from the impression as a consequence of the compressive effort applied to the article.

It is clear that this sheet 5 is extremely advantageous since it holds the plastic material before and during the compression application and facilitates the discharge of any bubbles up during the gelling step.

To improve the mechanical strength of the end product, another sheet of absorbent material may be, if desired, associated with the first sheet 5. This second sheet has however a chemical nature and dielectrical properties differing from those of the first sheet so that it will not melt during the gelling step. It may consist, for example, of glass wool, felt, cotton, rubber or any other suitable woven or non-woven material.

According to a preferred embodiment of the invention, pigments of plastic material, having the same chemical nature as those constituting the sheet 5 and the paste impregnating this sheet, but of a different color or shade, are deposited into certain hollow portions of the mold impression or cavity, before the assembly comprising the sheet or sheets of absorbent material and the supporting sheet is placed therein. Thus, during the manufacture of the desired article and due to the application of high-frequency currents, these pigments melt and become bonded to the plastic material constituting the article so as to impart the desired local color thereto. This color penetrates into the plastic layer and has therefore a very long life. This method of coloring articles may also be used for decorating the whole or part of the article, if the article is a shoe or the like.

By providing hollow zones in the impression it is also possible to form decorative elements in the article during the manufacture thereof.

According to the manufacturing method contemplated, the sheet 5 and the supporting sheet 6 may be cut beforehand or not from stock material to the inner contour of the impression corresponding to the desired end product or article. Similarly, the sheet 5 of absorbent material may be impregnated with plastic material either before or after the laying of said sheet upon the supporting sheet 6, this impregnation being either complete (and performed in this cause by using impregnation cylinders or calender rollers) or fragmentary, in which case silk-printing screens may be used.

FIG. 3 illustrates a device for carrying out this method. This device comprises a conveyor belt 7 driven continuously in the direction of the arrow 8. It also comprises:

A first station 9 whereat the supporting sheet or web 6 is deposited upon the belt 7;

A second station 10 whereat the sheet 5 of absorbent material, previously impregnated with pulverulent PVC, is laid upon the sheet 6;

A third station 12 whereat the mold 3 with its impression 4 disposed at the bottom is deposited upon the two sheets as aforesaid; and Finally, a gelling station 13.

At this gelling station 13, superposed presser rollers 14 rotating at a constant speed corresponding to the linear speed of the belt 7 are adapted to strongly compress the sheets 5 and 6. These rollers 14 are connected across the terminals of a high-frequency circuit adapted to heat the plastic material to its gelling temperature.

In a modified form of embodiment as illustrated in FIG. 4, the pair of rollers 14 are replaced by a pair of plates 16 of a mechanical or hydraulic press adapted to perform jointly the compression of sheet 5 disposed between mold 3 and supporting sheet 6, and the gelling of the plastic material by means of high-frequency currents. Each press plate is connected to one terminal of a high-frequency electric circuit.

Any desired article can be manufactured continuously by means of the device illustrated in FIG. 5. It comprises essentially an endless conveyor belt 7 travelling in the direction of the arrow 8 and fed in succession with a continuous web of supporting sheet 6a payed out from a supply roll 17 and a continuous web 5a of absorbent material payed out from another supply roll 18. The two webs thus superposed travel between the pair of pressure rollers 22 and 23. Roller 23 is lined with a silicone-containing material on which the negative impression of the desired article is formed through any suitable and known method. Each roller 22 or 23 is also electrically connected to one terminal of a high-frequency electric circuit (not shown) adapted to heat the plastic material to its gelling temperature.

The articles 24 thus produced are subsequently separated from one another by means of a press 25 equipped with punch means 26 adapted to cut out the articles from the continuous compound web 6.

This method is particularly advantageous for manufacturing relatively thin pieces, articles or objects having a thickness of order of, say, 0.02″ to 0.12″ notably for producing elements intended for use in the manufacture of shoes, morocco articles or other similar articles, but it will be readily understood that it is also applicable to the manufacture of thicker articles.

Finally, in a modified and preferred form of embodiment of this invention the sheet of absorbent material is impregnated with plastic pastes or powders of the same chemical nature, but having different degrees of plastification; that is, each comprising a different percentage of plasticizer.

Thus, after the gelling operation by means of high-frequency currents, the resulting article comprises on the one hand soft or flexible portions corresponding to the zones impregnated by the paste having the highest percentage of plasticizer and, on the other hand, rigid portions corresponding to the zones impregnated with the paste having the lowest percentage of plasticizer.

This particular embodiment further increases the general use of the method of this invention since it permits of manufacturing articles having rigid zones associated with flexible zones. It permits inter alia of making in a single operation shoe elements comprising reinforced areas, such as the heel with its stiffening or counter, and the upper with its harder toe end. On the other hand, with this modified form, it is also possible to reinforce locally certain portions of the shoe.

The stiffness of the rigid portions is subordinate to the amount or percentage of plasticizer incorporated in the plastic paste utilized, to the thickness of the sheet of absorbent material impregnated with said plastic paste, and also to the percentage of impregnation of this sheet.

What is claimed is:

1. A method of manufacturing relatively thin pieces for making shoe components, morocco articles and other similar articles, which comprises the steps of:
    preparing a mold comprising the negative impression of an article to be manufactured, said negative impression being formed by casting in a silicone-containing material having relatively low dielectric losses;
    impregnating a sheet of absorbent material with plastic material in pasty or pulverulent form, adapted for gelling, and of the same chemical nature as said sheet, said sheet and plastic material having a relatively high coefficient of dielectric losses;
    disposing upon said sheet of absorbent material impregnated with said plastic material a sheet support to form an assembly; and
    insuring a close bonding of the thusly impregnated sheet and sheet support by the combined action of compression to press said negative impression against the assembly comprising said impregnated sheet and said sheet support and of a high-frequency electric field to effecting the gelling and melting of said sheet of absorbent material and said plastic material to cause complete disappearance of said sheet of absorbent material.

2. A method as claimed in claim 1, wherein said sheet of absorbent material has an initial thickness greater than the depth of said negative impression.

3. A method as claimed in claim 1, wherein said sheet of absorbent material has an initial thickness greater than the depth of said negative impression, another sheet of absorbent material but of a nature differing from that of said first sheet of absorbent material and having a melting point higher than the gelling temperature, being associated with said first sheet.

4. A method as claimed in claim 2, wherein pigments, having the same chemical nature as the materials of said first sheet and said plastic material but of different color or shade, are deposited into at least part of said negative impression preliminary to the compressive said impregnated sheet of absorbent material whereby, during the gelling, said pigments will color the article at least locally.

5. A method as claimed in claim 4, wherein portions of said sheet of absorbent material are impregnated with plastic material containing a percentage of plasticizer lower than that contained by plastic material impregnating other portions, whereby after the gelling step those portions impregnated with the material having the lowest percentage of plasticizer have a greater rigidity than said other portions.

6. A method as claimed in claim 1, wherein said plastic material is in pasty or pulverulent form.

7. A method as claimed in claim 6, wherein said plastic material is polyvinyl chloride.

8. A method as claimed in claim 3, wherein said other sheet is glass wool, felt, cotton, or rubber.

9. A piece manufactured according to claim 1.

References Cited

UNITED STATES PATENTS

| | | | |
|---|---|---|---|
| 3,235,438 | 2/1966 | Wisotzky | 161—116 |
| 3,589,973 | 6/1971 | Mittman | 161—116 |
| 3,585,062 | 6/1971 | Hand et al. | 117—21 |
| 3,393,119 | 7/1968 | Dugan | 156—273 |
| 3,193,435 | 7/1965 | Schafer | 156—245 |
| 3,373,072 | 3/1968 | Jones | 161—116 |
| 3,244,571 | 4/1966 | Weisman | 161—124 |
| 3,386,874 | 6/1968 | Gros | 156—273 |
| 3,597,293 | 8/1971 | Willett | 156—245 |
| 3,531,365 | 9/1970 | Melin | 156—273 |
| 3,616,954 | 11/1971 | Peck | 161—118 |

ROBERT F. BURNETT, Primary Examiner

G. W. MOXON, II, Assistant Examiner

U.S. Cl. X.R.

117—21, 28, 93.1 DH; 156—209, 219, 220, 245, 273; 161—124, 164, 247, 256; 264—136